United States Patent
Ishihara et al.

(10) Patent No.: US 10,161,821 B2
(45) Date of Patent: Dec. 25, 2018

(54) PRESSURE SENSOR

(71) Applicant: AZBIL CORPORATION, Chiyoda-ku (JP)

(72) Inventors: Takuya Ishihara, Chiyoda-ku (JP); Masaru Soeda, Chiyoda-ku (JP); Masashi Sekine, Chiyoda-ku (JP); Hidenobu Tochigi, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/889,974

(22) Filed: Feb. 6, 2018

(65) Prior Publication Data
US 2018/0224347 A1 Aug. 9, 2018

(30) Foreign Application Priority Data
Feb. 8, 2017 (JP) ................................ 2017-021102

(51) Int. Cl.
G08B 21/00 (2006.01)
G01L 9/12 (2006.01)
G01L 9/00 (2006.01)
G08B 21/18 (2006.01)
G01L 19/12 (2006.01)

(52) U.S. Cl.
CPC ............ G01L 9/125 (2013.01); G01L 9/0044 (2013.01); G01L 9/0075 (2013.01); G01L 19/12 (2013.01); G08B 21/182 (2013.01)

(58) Field of Classification Search
None
See application file for complete search history.

(56) References Cited

U.S. PATENT DOCUMENTS

| | | | | |
|---|---|---|---|---|
| 3,643,510 A * | 2/1972 | Lissau | ...................... | G01L 1/02 73/708 |
| 3,844,173 A * | 10/1974 | Rockstead | ............ | G01L 9/0004 73/728 |
| 5,042,308 A * | 8/1991 | Nakamura | ............ | G01L 9/0073 361/283.4 |
| 5,756,899 A * | 5/1998 | Ugai | ...................... | G01F 1/383 73/714 |
| 2002/0194919 A1* | 12/2002 | Lee | ........................ | G01L 9/0042 73/718 |

(Continued)

FOREIGN PATENT DOCUMENTS

JP 2014-109484 6/2014

OTHER PUBLICATIONS

Shunji Ichida et al., Development of SPS300 Intelligent Pressure Sensor. Savemation Review, vol. 9, No. 1, (1991), p. 8-14.

*Primary Examiner* — Julie Lieu
(74) *Attorney, Agent, or Firm* — Oblon, McClelland, Maier & Neustadt, L.L.P.

(57) ABSTRACT

A pressure change measuring unit causes a temperature control unit to operate and vary the temperature of a sensor chip in a predetermined temperature range, and measures changes in pressure value output from the sensor chip whose temperature is being varied. A temperature characteristic calculating unit calculates a temperature characteristic of the sensor chip from changes in the temperature of the sensor chip caused by the operation of the temperature control unit and changes in pressure value measured by the pressure change measuring unit.

5 Claims, 3 Drawing Sheets

(56) References Cited

U.S. PATENT DOCUMENTS

| | | | | |
|---|---|---|---|---|
| 2009/0114029 A1* | 5/2009 | Ide | G01L 9/0072 | |
| | | | | 73/724 |
| 2012/0216621 A1* | 8/2012 | Oto | G01L 9/008 | |
| | | | | 73/715 |
| 2014/0069198 A1* | 3/2014 | Barron | G01L 9/125 | |
| | | | | 73/724 |
| 2014/0208859 A1* | 7/2014 | Miyashita | G01L 9/12 | |
| | | | | 73/718 |
| 2015/0362391 A1* | 12/2015 | Suzuki | G01L 9/0044 | |
| | | | | 137/511 |

* cited by examiner

PRESSURE SENSOR

CROSS-REFERENCE TO RELATED APPLICATIONS

The present application is based on and claims priority to Japanese Application No. 2017-021102, filed Feb. 8, 2017, the entire contents of which are incorporated herein by reference.

BACKGROUND

1. Field

The present disclosure relates to a pressure sensor, and particularly relates to a pressure sensor including a detecting device that includes a diaphragm that is displaced in response to pressure from a fluid.

2. Description of the Related Art

A pressure sensor, such as a capacitance diaphragm gauge, includes a detecting device that includes a diaphragm. With the detecting device attached to a pipe or the like through which a gas to be measured flows, the pressure sensor converts the amount of deflection (or displacement) of the diaphragm under pressure into a capacitance value and outputs a pressure value determined from the capacitance value. This pressure sensor is less dependent on the type of gas and thus is used, for example, in semiconductor facilities and a wide range of industrial applications (see, e.g., Japanese Unexamined Patent Application Publication No. 2014-109484).

As illustrated in FIG. 4, a detecting device of a pressure sensor, such as a diaphragm gauge, includes a diaphragm 302 configured to receive pressure from an object to be measured, and a base 301 provided with a recess in the center thereof in plan view and having a support portion 301a that supports the diaphragm 302. The diaphragm 302 and the base 301 define a capacitance chamber 303. In the diaphragm 302 supported by the support portion 301a, a movable region 302a spaced from the base 301 can be displaced in the direction of the base 301. The diaphragm 302 and the base 301 are made of an insulating material, such as sapphire.

The detecting device of the pressure sensor includes a movable electrode 304 formed in the movable region 302a of the diaphragm 302, and a fixed electrode 305 formed on the base 301 and facing the movable electrode 304. The detecting device of the pressure sensor further includes a movable reference electrode 306 formed around the movable electrode 304 in the movable region 302a of the diaphragm 302, and a fixed reference electrode 307 formed on the base 301 around the fixed electrode 305 and facing the movable reference electrode 306.

The detecting device of the pressure sensor described above needs not only to be resistant to corrosion by a gas used in an apparatus to which the pressure sensor is attached, but also to be resistant to byproducts produced during the process of film deposition or the like. Byproducts produced during the film deposition process are deposited on areas exposed to a raw material gas. Examples of the areas include the inner wall of a film deposition chamber, the inner wall of a pipe, the interior of a vacuum pump, and the diaphragm serving as a pressure receiver of the pressure sensor. For example, as illustrated in FIG. 4, a byproduct 321 is deposited on the diaphragm 302.

For example, in atomic layer deposition (ALD) used for forming gate insulators, byproducts are deposited, because of their properties, on various areas exposed to a raw material gas. To prevent deposition of such byproducts, for example, each part of a film depositing apparatus where byproducts tend to deposit is heated to about 200° C. during a film deposition operation.

For example, the pressure sensor heats the detecting device to reduce deposition of byproducts, whereas the film depositing apparatus performs similar heating using a heater which is attached to a pipe portion for introducing pressure to the diaphragm of the pressure sensor.

The pressure sensor has a sensitivity to temperature changes (temperature characteristic) (see, e.g., Ichida, Shunji et al. (1991). Development of SPS300 Intelligent Pressure Sensor. *Savemation Review*, vol. 9, no. 1, pp. 8-14). Therefore, assembly of the pressure sensor is normally followed by evaluation of the temperature characteristic. Then, a measurement circuit, which is configured to correct the output of the pressure sensor in accordance with the temperature at which the detecting device is heated, is adjusted in such a manner that the impact of temperature changes is reduced. This adjustment is followed by shipment of the pressure sensor.

However, even when the heating described above is performed as a preventive measure, byproducts are deposited little by little. The deposition results in changes in the mechanical and thermal characteristics of the diaphragm. Since the byproducts differ from materials forming the diaphragm, the sensitivity of the detecting device to temperature is changed.

The temperature characteristic of the detecting device is changed not only by formation of byproducts, but also by alteration of the surface of the diaphragm caused by exposure to a corrosive gas for etching. Specifically, the temperature characteristic is changed when the diaphragm is etched similarly to a substrate to be processed. The temperature characteristic is also changed when the surface of the diaphragm chemically reacts and changes its properties. The mechanical characteristics of the diaphragm are also changed, for example, by an impact transmitted through a joint or welded portion for securing the diaphragm and a package of the detecting device.

When the mechanical balance of the diaphragm serving as a pressure receiver is changed by stress relaxation or thermal deformation in such a manner as described above, the temperature characteristic is changed and made different from that when adjusted. In this case, the result of measurement made by the pressure sensor differs from actual one and significantly affects the process quality.

As described above, when the temperature characteristic of the detecting device is changed and the pressure sensor is unable to properly perform measurement, the detecting device is recognized as faulty. The faulty detecting device is typically removed from the apparatus and replaced. For replacement of the detecting device, the apparatus needs to be shut down for many hours and this leads to a significant decrease in productivity.

Even when the detecting device recognized as faulty, if it is due to change in temperature characteristic and the adjustment of the temperature characteristic described above is carried out again, the detecting device can be used continuously without being replaced. However, in the related art, adjustment of the temperature characteristic involves removing the detecting device from the apparatus, and this leads to a significant decrease in productivity as described above.

SUMMARY

The present disclosure has been made to solve the problems described above. An object of the present disclosure is to make it possible to adjust the temperature characteristic of the pressure sensor without removing the detecting device from the apparatus.

A pressure sensor according to an aspect of the present disclosure includes a detecting device including a diaphragm displaced in response to pressure from an object to be measured, the detecting device being configured to convert the displacement of the diaphragm into a change in physical quantity; a pressure value output unit configured to convert the change in physical quantity caused by the displacement of the diaphragm into a pressure value and output the pressure value; a storage unit configured to store a temperature characteristic representing changes in pressure value with changes in the temperature of the detecting device in a predetermined temperature range; a correcting unit configured to correct the pressure value output by the pressure value output unit with the temperature characteristic stored in the storage unit in accordance with a measured temperature of the detecting device; a temperature control unit configured to vary the temperature of the detecting device in the predetermined temperature range; a pressure change measuring unit configured to cause the temperature control unit to operate and vary the temperature of the detecting device in the predetermined temperature range, the pressure change measuring unit being configured to measure changes in pressure value output from the pressure value output unit while the temperature of the detecting device is being varied; a temperature characteristic calculating unit configured to calculate a temperature characteristic of the detecting device from changes in the temperature of the detecting device caused by the operation of the temperature control unit and changes in pressure value measured by the pressure change measuring unit; a characteristic difference calculating unit configured to determine a characteristic difference between the temperature characteristic stored in the storage unit and the temperature characteristic calculated by the temperature characteristic calculating unit; and an updating unit configured to update, when the characteristic difference determined by the characteristic difference calculating unit exceeds an update reference value, the temperature characteristic stored in the storage unit with the temperature characteristic calculated by the temperature characteristic calculating unit.

The pressure sensor may further include an alarm output unit configured to issue an alarm when the characteristic difference determined by the characteristic difference calculating unit exceeds an abnormality threshold.

In the pressure sensor, the characteristic difference calculating unit may determine, as the characteristic difference, an integral of a difference between the temperature characteristic stored in the storage unit and the temperature characteristic calculated by the temperature characteristic calculating unit in the predetermined temperature range. Alternatively, the characteristic difference calculating unit may determine, as the characteristic difference, a difference between the temperature characteristic stored in the storage unit and the temperature characteristic calculated by the temperature characteristic calculating unit at a maximum or minimum value in the predetermined temperature range.

In the pressure sensor, the detecting device may include a base partly spaced from the diaphragm and configured to support the diaphragm, a first electrode disposed on the diaphragm, and a second electrode disposed on the base and facing the first electrode; and the pressure value output unit may be configured to convert a change in capacitance between the first electrode and the second electrode caused by displacement of the diaphragm into a pressure value and output the pressure value.

With the configurations described above, the present disclosure makes it possible to adjust the temperature characteristic of the pressure sensor without removing the detecting device from the apparatus.

DETAILED DESCRIPTION

Figure 1:
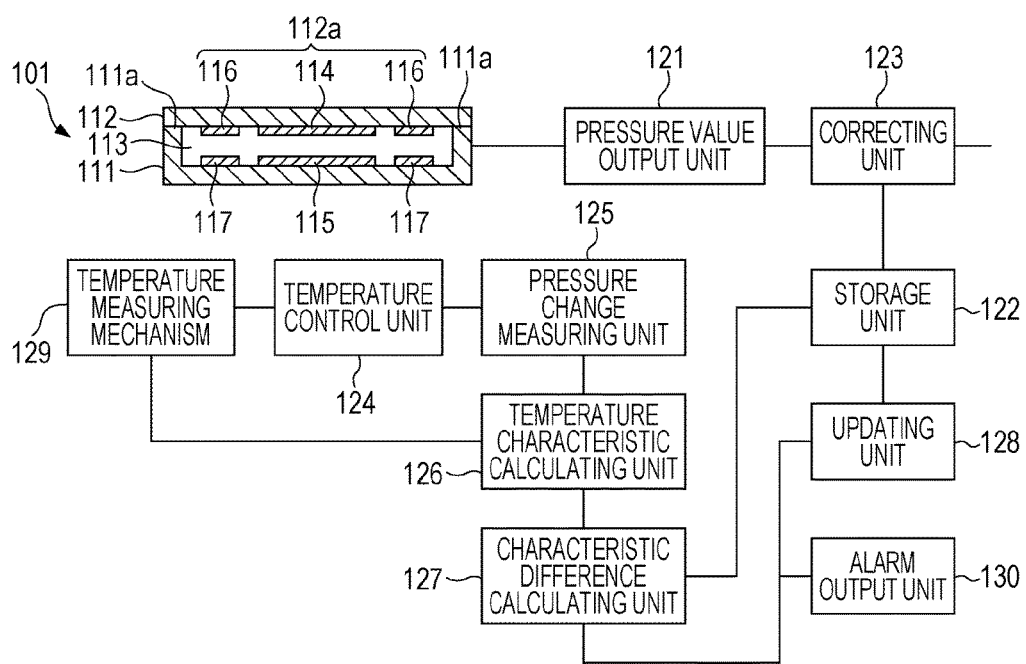
FIG. 1 is a diagram illustrating a configuration of a pressure sensor according to an embodiment of the present disclosure.

Hereinafter, an embodiment of the present disclosure will be described with reference to the drawings. FIG. 1 is a diagram illustrating a configuration of a pressure sensor according to an embodiment of the present disclosure. The pressure sensor includes a sensor chip (detecting device) 101, a pressure value output unit 121, a storage unit 122, a correcting unit 123, a temperature control unit 124, a pressure change measuring unit 125, a temperature characteristic calculating unit 126, a characteristic difference calculating unit 127, and an updating unit 128.

In the present embodiment, the sensor chip 101 is of a well-known capacitance type, and includes a base 111, a diaphragm 112, a movable electrode (first electrode) 114, and a fixed electrode (second electrode) 115. The sensor chip 101 is configured to convert a displacement of the diaphragm 112 into another physical quantity (e.g., capacitance).

For example, the base 111 and the diaphragm 112 are made of an insulating material resistant to heat and corrosion, such as sapphire or alumina ceramic. The diaphragm 112 serving as a pressure receiver is supported by a support portion ilia of the base 111 having a recess in the center thereof in plan view. In a movable region 112a inside the support portion 111a, the diaphragm 112 can be displaced in the direction of the base 111. The movable region 112a is, for example, circular in plan view.

The diaphragm 112 and the base 111 define a capacitance chamber 113 therebetween in the movable region 112a. The capacitance chamber 113 maintains a so-called vacuum therein and serves as a reference vacuum chamber. This means that the pressure sensor according to the embodiment is a vacuum gauge that measures pressure (or the degree of vacuum) in an environment where pressure is lower than atmospheric pressure.

In the capacitance chamber 113, the movable electrode 114 is formed in the movable region 112a of the diaphragm 112. Also in the capacitance chamber 113, the fixed electrode 115 is formed on the base 111 in such a manner as to face the movable electrode 114. The sensor chip 101 includes a movable reference electrode 116 and a fixed reference electrode 117. In the capacitance chamber 113, the movable reference electrode 116 is formed around the movable electrode 114 in the movable region 112a of the diaphragm 112. Also in the capacitance chamber 113, the fixed reference electrode 117 is formed on the base 111 around the fixed electrode 115. The movable reference electrode 116 and the fixed reference electrode 117 face each other.

The pressure value output unit 121 converts a change in physical quantity caused by the displacement of the diaphragm 112 into a pressure value and outputs the pressure value. For example, the pressure value output unit 121 converts a change in capacitance caused by displacement of the diaphragm 112 into a pressure value using a set sensor sensitivity and outputs the pressure value.

The storage unit 122 stores a temperature characteristic that represents changes in pressure value with changes in temperature in a predetermined temperature range of the sensor chip 101. For example, when the sensor chip 101 is used at a set temperature of 100° C., the storage unit 122 stores a temperature characteristic that represents changes in pressure value with changes in temperature in an actual use temperature range of 95° C. to 105° C. For example, initially (at the factory), the temperature of the sensor chip 101 is varied in the range of 95° C. to 105° C., and the resulting changes in pressure value output from the pressure value output unit 121 are measured. A temperature characteristic is determined from this measurement and stored as an initial value of the temperature characteristic in the storage unit 122.

In accordance with the temperature of the sensor chip 101 measured by a temperature measuring mechanism 129, the correcting unit 123 corrects the pressure value output by the pressure value output unit 121 with the temperature characteristic stored in the storage unit 122.

A temperature characteristic will now be explained. The pressure sensor of the above-described type outputs different pressure values for the same pressure (or the degree of vacuum) depending on the temperature at which the sensor chip 101 is used. A factor that determines this temperature characteristic is the expansion and contraction of the sensor chip 101 caused by heat. Another factor determining the temperature characteristic is a bimetallic effect based on a difference in thermal expansion coefficient between the base material and the electrode material of the sensor chip 101. Another factor determining the temperature characteristic is a mechanical impact the sensor chip 101 receives from the package having the sensor chip 101 mounted thereon. Another factor determining the temperature characteristic is changes in the resistance value of the electrode material with changes in temperature.

Generally, the factors that determine the temperature characteristic described above are not easily reduced to levels that do not cause problems in actual use. Therefore, as described above, after the temperature characteristic is measured in the initial state, the measured temperature characteristic is corrected by the correcting unit 123 in such a manner that it is cancelled out, and is then output.

The temperature control unit 124 varies the temperature of the sensor chip 101 in a predetermined temperature range. For example, the temperature control unit 124 drives a well-known self-heating heater (not shown) of the sensor chip 101 to vary the temperature of the sensor chip 101 in a predetermined temperature range. The pressure change measuring unit 125 causes the temperature control unit 124 to operate and vary the temperature of the sensor chip 101 in the predetermined temperature range. While the temperature of the sensor chip 101 is being varied, the pressure change measuring unit 125 measures changes in pressure value output from the pressure value output unit 121.

The temperature characteristic calculating unit 126 calculates the temperature characteristic of the sensor chip 101 from changes in the temperature of the sensor chip 101 caused by the operation of the temperature control unit 124 and changes in pressure value measured by the pressure change measuring unit 125. The characteristic difference calculating unit 127 determines a characteristic difference between the temperature characteristic stored in the storage unit 122 and the temperature characteristic calculated by the temperature characteristic calculating unit 126.

If the characteristic difference determined by the characteristic difference calculating unit 127 exceeds an update reference value, the updating unit 128 updates the temperature characteristic stored in the storage unit 122 with the temperature characteristic calculated by the temperature characteristic calculating unit 126.

The pressure sensor of the present embodiment further includes an alarm output unit 130. If the characteristic difference determined by the characteristic difference calculating unit 127 exceeds an abnormality threshold, the alarm output unit 130 issues an alarm indicating that the sensor chip 101 is in an abnormal state.

Figure 2:
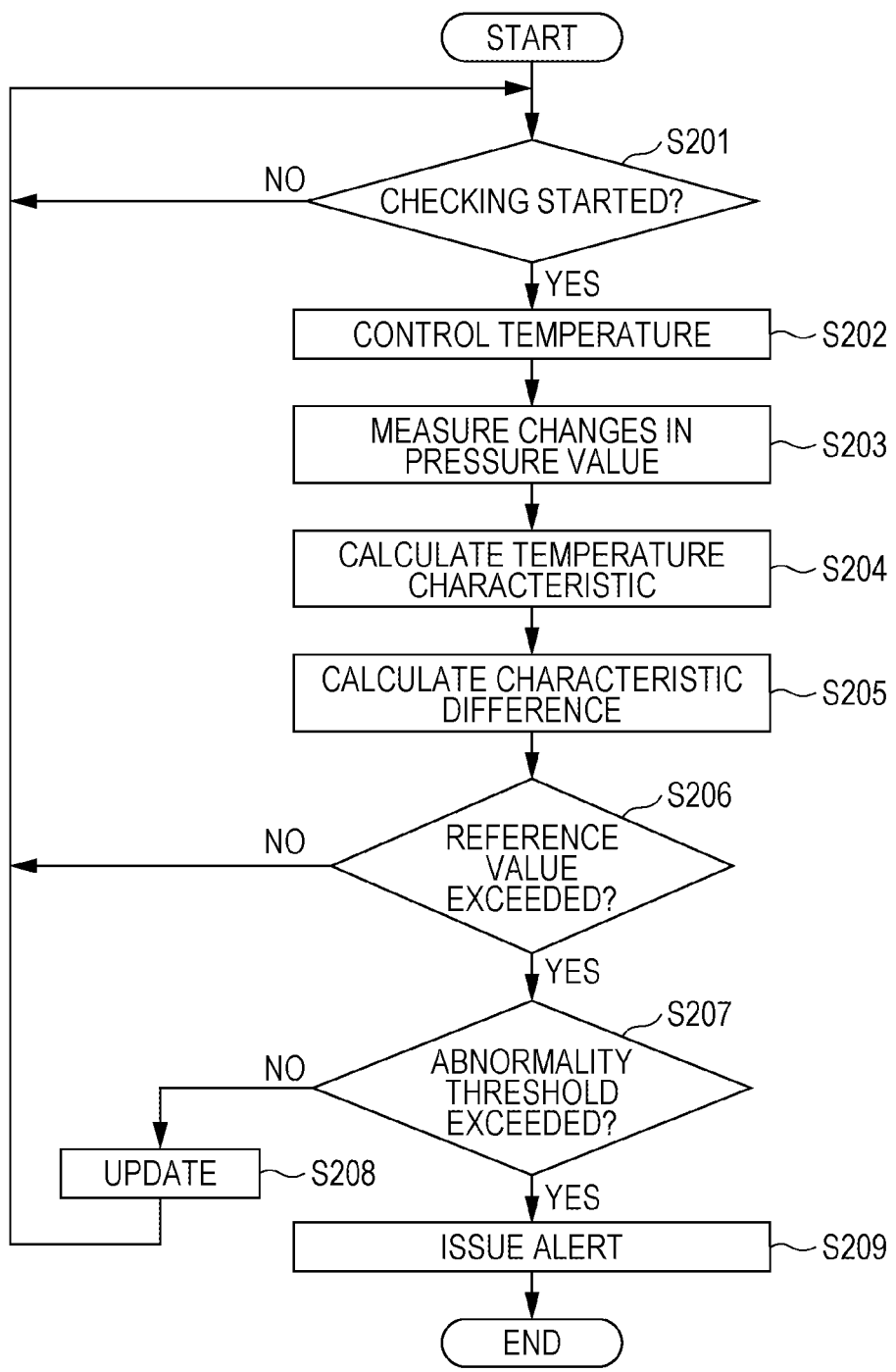
FIG. 2 is a flowchart illustrating an operation of the pressure sensor according to the embodiment.

An operation of the pressure sensor according to the embodiment of the present disclosure will now be described with reference to the flowchart of FIG. 2.

In step S201, when there is an instruction to start checking of a temperature characteristic (YES in step S201), the pressure change measuring unit 125 causes the temperature control unit 124 to operate and vary the temperature of the sensor chip 101 in a predetermined temperature range in step S202. For example, by feedback control using a temperature measured by the temperature measuring mechanism 129, the temperature control unit 124 varies the temperature of the sensor chip 101 from 95° C. to 105° C. For example, checking of the temperature characteristic may be started upon receiving input of a start instruction from the user. Alternatively, checking of the temperature characteristic may be started immediately after well-known zero-point adjustment of the pressure sensor. In this state, a pressure value output from the pressure value output unit 121 is known.

In step S203, the pressure change measuring unit 125 measures changes in pressure value output from the sensor chip 101 whose temperature is being varied. In step S204, the temperature characteristic calculating unit 126 calculates the temperature characteristic of the sensor chip 101 from changes in the temperature of the sensor chip 101 caused by the operation of the temperature control unit 124 and changes in pressure value measured by the pressure change measuring unit 125.

Figure 3:
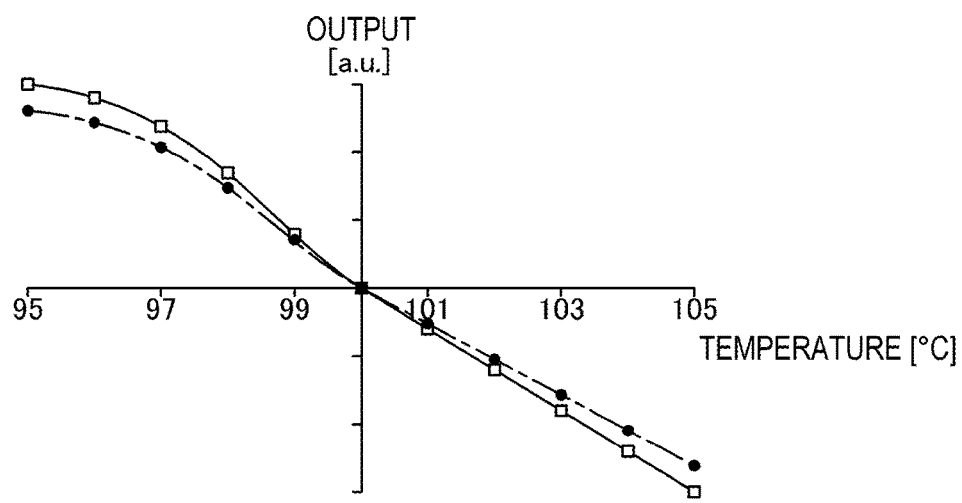
FIG. 3 is a characteristic diagram showing a temperature characteristic of a sensor chip.
Figure 4:
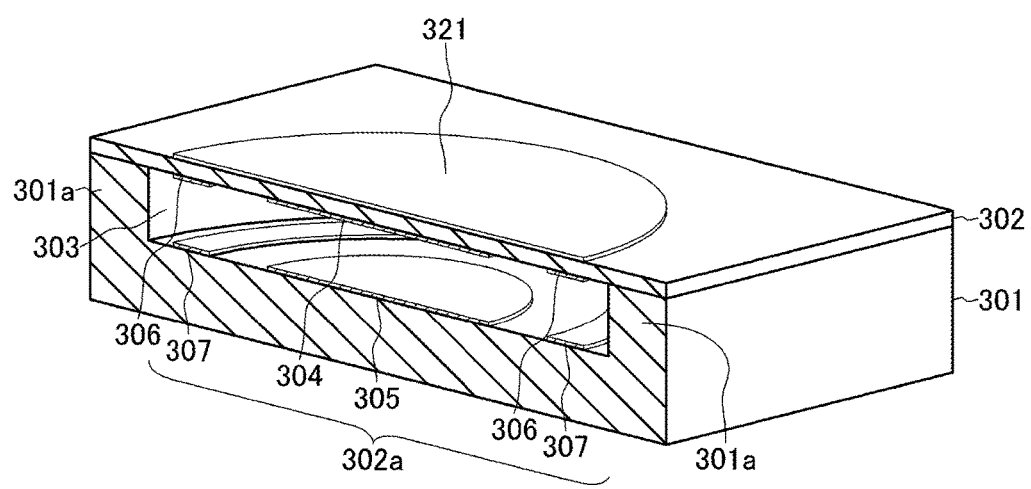
FIG. 4 is a perspective cutaway view of part of a configuration of a detecting device included in a diaphragm gauge.

For example, on the basis of pressure values measured with respect to temperature at 11 points, as indicated by filled circles in FIG. 3, the temperature characteristic calculating unit 126 makes an approximation using a polynomial to calculate a temperature characteristic indicated by a dot-and-dash line.

In step S205, the characteristic difference calculating unit 127 determines a characteristic difference between a temperature characteristic stored in the storage unit 122 and the temperature characteristic calculated by the temperature characteristic calculating unit 126. For example, the storage unit 122 stores an initial temperature characteristic determined on the basis of pressure values measured with respect to temperature at 11 points, as indicated by open rectangles in FIG. 3. The characteristic difference calculating unit 127 determines a difference in temperature characteristic between the initial temperature characteristic indicated by a solid line in FIG. 3 and the temperature characteristic indicated by the dot-and-dash line described above.

For example, as the characteristic difference, the characteristic difference calculating unit 127 determines an integral of a difference between the temperature characteristic stored in the storage unit 122 and the temperature characteristic calculated by the temperature characteristic calculating unit 126 in the predetermined temperature range. Alternatively, as the characteristic difference, the characteristic difference calculating unit 127 determines a difference between the temperature characteristic stored in the storage unit 122 and the temperature characteristic calculated by the temperature characteristic calculating unit 126 at the maximum or minimum value in the predetermined temperature range. The characteristic difference calculating unit 127 may calculate a difference between the temperature characteristic stored in the storage unit 122 and the temperature characteristic calculated by the temperature characteristic calculating unit 126 at several different temperature points in the predetermined temperature range, and determine the average or sum of the resulting differences as the characteristic difference.

In step S206, the updating unit 128 determines whether the characteristic difference determined by the characteristic difference calculating unit 127 exceeds an update reference value. If the updating unit 128 determines that the characteristic difference determined by the characteristic difference calculating unit 127 exceeds the update reference value (YES in step S206), the alarm output unit 130 determines in step S207 whether the characteristic difference determined by the characteristic difference calculating unit 127 exceeds an abnormality threshold.

If the alarm output unit 130 determines that the characteristic difference determined by the characteristic difference calculating unit 127 does not exceed the abnormality threshold (NO in step S207), the updating unit 128 updates, in step S208, the temperature characteristic stored in the storage unit 122 with the temperature characteristic calculated by the temperature characteristic calculating unit 126. On the other hand, if the alarm output unit 130 determines that the characteristic difference determined by the characteristic difference calculating unit 127 exceeds the abnormality threshold (YES in step S207), the alarm output unit 130 issues an alarm indicating that the sensor chip 101 is in an abnormal state in step S209.

In the present disclosure, as described above, the temperature characteristic of the detecting device (sensor chip) is measured and updated during actual use. It is thus possible to adjust the temperature characteristic of the pressure sensor without removing the detecting device from an apparatus.

The present disclosure is not limited to the embodiments described above, and it is evident that various modifications and combinations can be made by those with ordinary knowledge of the art within the technical spirit of the present disclosure. For example, although a capacitance diaphragm gauge has been described as an example, the present disclosure is not limited to this. The present disclosure is also applicable to a piezoresistive pressure sensor that detects displacement of a diaphragm as a change in piezoresistance.

What is claimed is:

1. A pressure sensor comprising:
a detecting device including a diaphragm displaced in response to pressure from an object to be measured, the detecting device being configured to convert the displacement of the diaphragm into a change in physical quantity;
a pressure value output unit configured to convert the change in physical quantity caused by the displacement of the diaphragm into a pressure value and output the pressure value;
a storage unit configured to store a temperature characteristic representing changes in pressure value with changes in the temperature of the detecting device in a predetermined temperature range;
a correcting unit configured to correct the pressure value output by the pressure value output unit with the temperature characteristic stored in the storage unit in accordance with a measured temperature of the detecting device;
a temperature control unit configured to vary the temperature of the detecting device in the predetermined temperature range;
a pressure change measuring unit configured to cause the temperature control unit to operate and vary the temperature of the detecting device in the predetermined temperature range, the pressure change measuring unit being configured to measure changes in pressure value output from the pressure value output unit while the temperature of the detecting device is being varied;
a temperature characteristic calculating unit configured to calculate a temperature characteristic of the detecting device from changes in the temperature of the detecting device caused by the operation of the temperature control unit and changes in pressure value measured by the pressure change measuring unit;
a characteristic difference calculating unit configured to determine a characteristic difference between the temperature characteristic stored in the storage unit and the temperature characteristic calculated by the temperature characteristic calculating unit; and
an updating unit configured to update, when the characteristic difference determined by the characteristic difference calculating unit exceeds an update reference value, the temperature characteristic stored in the storage unit with the temperature characteristic calculated by the temperature characteristic calculating unit.

2. The pressure sensor according to claim 1, further comprising an alarm output unit configured to issue an alarm when the characteristic difference determined by the characteristic difference calculating unit exceeds an abnormality threshold.

3. The pressure sensor according to claim 1, wherein the characteristic difference calculating unit determines, as the characteristic difference, an integral of a difference between the temperature characteristic stored in the storage unit and the temperature characteristic calculated by the temperature characteristic calculating unit in the predetermined temperature range.

4. The pressure sensor according to claim 1, wherein the characteristic difference calculating unit determines, as the characteristic difference, a difference between the temperature characteristic stored in the storage unit and the temperature characteristic calculated by the temperature characteristic calculating unit at a maximum or minimum value in the predetermined temperature range.

5. The pressure sensor according to claim 1, wherein the detecting device includes a base partly spaced from the diaphragm and configured to support the diaphragm, a first electrode disposed on the diaphragm, and a second electrode disposed on the base and facing the first electrode; and
the pressure value output unit is configured to convert a change in capacitance between the first electrode and the second electrode caused by displacement of the diaphragm into a pressure value and output the pressure value.

* * * * *